US009542344B2

(12) United States Patent
Tuers et al.

(10) Patent No.: US 9,542,344 B2
(45) Date of Patent: Jan. 10, 2017

(54) DATAPATH MANAGEMENT IN A MEMORY CONTROLLER

(71) Applicant: SanDisk Technologies Inc., Plano, TX (US)

(72) Inventors: Daniel Tuers, Kapaa, HI (US); Abhijeet Manohar, Karnataka (IN); Venkata Krishna Nadh Dhulipala, San Jose, CA (US); Girish B. Desai, Cupertino, CA (US)

(73) Assignee: SanDisk Technologies LLC, Plano, TX (US)

( * ) Notice: Subject to any disclaimer, the term of this patent is extended or adjusted under 35 U.S.C. 154(b) by 378 days.

(21) Appl. No.: 14/184,208

(22) Filed: Feb. 19, 2014

(65) Prior Publication Data

US 2015/0234756 A1 Aug. 20, 2015

(51) Int. Cl.
*G06F 13/20* (2006.01)
*G06F 13/18* (2006.01)
*G06F 13/28* (2006.01)

(52) U.S. Cl.
CPC ............... *G06F 13/18* (2013.01); *G06F 13/28* (2013.01)

(58) Field of Classification Search
CPC ................................. G06F 13/28; G06F 13/18
USPC .......................................................... 710/313
See application file for complete search history.

(56) References Cited

U.S. PATENT DOCUMENTS 5,070,032 A 12/1991 Yuan et al.
5,095,344 A 3/1992 Harari
5,313,421 A 5/1994 Guterman et al.
5,315,541 A 5/1994 Harari et al.
5,343,063 A 8/1994 Yuan et al.
5,570,315 A 10/1996 Tanaka et al.
5,661,053 A 8/1997 Yuan
5,768,192 A 6/1998 Eitan
5,903,495 A 5/1999 Takeuchi et al.
6,011,725 A 1/2000 Eitan
6,046,935 A 4/2000 Takeuchi et al.
6,222,762 B1 4/2001 Guterman et al.
8,144,512 B2 3/2012 Huang et al.
8,468,294 B2 6/2013 Huang et al.
8,762,609 B1 * 6/2014 Lam .................... G06F 15/8007 710/22
9,141,561 B2 * 9/2015 Lasserre ........... G11C 11/40611
2013/0019053 A1 1/2013 Somanache et al.
2013/0262753 A1 10/2013 Prins et al.
2013/0318285 A1 11/2013 Pignatelli
2014/0115089 A1 * 4/2014 Maybee ............ G06F 17/30466 709/213
2014/0376299 A1 * 12/2014 Cleveland .......... G11C 13/0097 365/148

OTHER PUBLICATIONS

Eitan et al., "NROM: A Novel Localized Trapping, 2-Bit Nonvolatile Memory Cell," IEEE Electron Device Letters, vol. 21, No. 11, Nov. 2000, pp. 543-545.

* cited by examiner

*Primary Examiner* — Chun-Kuan Lee
(74) *Attorney, Agent, or Firm* — Davis Wright Tremaine LLP

(57) ABSTRACT

A non-volatile memory controller coordinates multiple datapath units along a datapath between a host side and a memory side by unit-to-unit communication, or by a datapath control unit that is in communication with multiple datapath units. Data of a data stream is prioritized so that it passes along the datapath without interruption.

25 Claims, 14 Drawing Sheets

Threshold Window

DATAPATH MANAGEMENT IN A MEMORY CONTROLLER

BACKGROUND

This application relates to the operation of nonvolatile memory controllers such as flash memory controllers, and, more specifically, to systems and methods of managing elements within such memory controllers in an efficient manner.

Solid-state memory capable of nonvolatile storage of charge, particularly in the form of EEPROM and flash EEPROM packaged as a small form factor card, has recently become the storage of choice in a variety of mobile and handheld devices, notably information appliances and consumer electronics products. Unlike RAM (random access memory) that is also solid-state memory, flash memory is non-volatile, and retaining its stored data even after power is turned off. Also, unlike ROM (read only memory), flash memory is rewritable similar to a disk storage device. In spite of the higher cost, flash memory is increasingly being used in mass storage applications. Conventional mass storage, based on rotating magnetic medium such as hard drives and floppy disks, is unsuitable for the mobile and handheld environment. This is because disk drives tend to be bulky, are prone to mechanical failure and have high latency and high power requirements. These undesirable attributes make disk-based storage impractical in most mobile and portable applications. On the other hand, flash memory, both embedded and in the form of a removable card is ideally suited in the mobile and handheld environment because of its small size, low power consumption, high speed and high reliability features.

Flash EEPROM is similar to EEPROM (electrically erasable and programmable read-only memory) in that it is a non-volatile memory that can be erased and have new data written or "programmed" into their memory cells. Both utilize a floating (unconnected) conductive gate, in a field effect transistor structure, positioned over a channel region in a semiconductor substrate, between source and drain regions. A control gate is then provided over the floating gate. The threshold voltage characteristic of the transistor is controlled by the amount of charge that is retained on the floating gate. That is, for a given level of charge on the floating gate, there is a corresponding voltage (threshold) that must be applied to the control gate before the transistor is turned "on" to permit conduction between its source and drain regions. In particular, flash memory such as Flash EEPROM allows entire blocks of memory cells to be erased at the same time.

Nonvolatile memory devices are also manufactured from memory cells with a dielectric layer for storing charge. Instead of the conductive floating gate elements described earlier, a dielectric layer is used. Such memory devices utilizing dielectric storage element have been described by Eitan et al., "NROM: A Novel Localized Trapping, 2-Bit Nonvolatile Memory Cell," IEEE Electron Device Letters, vol. 21, no. 11, November 2000, pp. 543-545. An ONO dielectric layer extends across the channel between source and drain diffusions. The charge for one data bit is localized in the dielectric layer adjacent to the drain, and the charge for the other data bit is localized in the dielectric layer adjacent to the source. For example, U.S. Pat. Nos. 5,768,192 and 6,011,725 disclose a nonvolatile memory cell having a trapping dielectric sandwiched between two silicon dioxide layers. Multi-state data storage is implemented by separately reading the binary states of the spatially separated charge storage regions within the dielectric.

In addition to flash memory, other forms of nonvolatile memory may be used in nonvolatile memory systems. For example Ferroelectric RAM (FeRAM, or FRAM) uses a ferroelectric layer to record data bits by applying an electric field that orients the atoms in a particular area with an orientation that indicates whether a "1" or a "0" is stored. Magnetoresistive RAM (MRAM) uses magnetic storage elements to store data bits. Phase-Change memory (PCME, or PRAM) such as Ovonic Unified Memory (OUM) uses phase changes in certain materials to record data bits. Various other nonvolatile memories are also in use or proposed for use in nonvolatile memory systems.

Nonvolatile memory systems, such as flash memory systems are commonly provided in the form of a memory card or flash drive that is removably connected with a variety of hosts such as a personal computer, a camera or the like, but may also be embedded within such host systems. When writing data to the memory, the host typically assigns unique logical addresses to sectors, clusters or other units of data within a continuous virtual address space of the memory system. Like a disk operating system (DOS), the host writes data to, and reads data from, addresses within the logical address space of the memory system. A memory controller is typically provided within the memory system to translate logical addresses received from the host into physical addresses within the memory array, where the data are actually stored, and then keeps track of these address translations. The memory controller may perform a variety of other functions also.

A memory controller chip is typically formed as an ASIC that is designed to perform the particular functions needed in a particular memory system. These functions may include address translation as described above, Error Correction Coding (ECC) and/or other redundancy schemes such as Exclusive OR (XOR), management of multiple memory chips on one or more memory busses, encryption/decryption, and management of communication with a host through a host interface.

FIG. 1 shows an example of a prior art memory system which includes a flash memory, a memory controller, and a host interface, all enclosed in a housing that provides physical protection. While the flash memory is shown a single unit in FIG. 1, it may be made up of multiple memory chips (on one or more memory busses) that are all under the control of the memory controller. The memory controller, or ASIC, performs many functions in this memory system. In order to keep memory controller costs down, it is desirable to efficiently use the resources provided in a memory controller.

SUMMARY

According to a general aspect of the invention, a nonvolatile memory controller that includes multiple datapath units, each with separate context queues allowing separate operation, coordinates operation of different datapath units. A datapath control unit may manage operations of different datapath units to provide improved performance in certain situations. For example, when a stream of data is detected, the datapath control unit may prioritize the data of the stream so that it passes from datapath unit to datapath unit without interruption. Data that is received out of order from a memory bus may be reordered by a datapath control unit. When a particular operation is likely to take a long time, contexts associated with the operation may be given lower priority until the operation is completed. In some cases, a datapath unit may communicate directly with another datapath unit so that a datapath control unit is not needed (i.e. there is direct communication between datapath units rather than through a datapath control unit). A broadcast communication from one datapath unit may cause other datapath units to prioritize particular data (e.g. data of a data stream).

An example of a method of operating a nonvolatile memory controller includes: maintaining a first queue of contexts for a first datapath unit that acts on data between a host interface of the memory controller and a nonvolatile memory bus; maintaining a second queue of contexts for a second datapath unit that acts on data in series with the first datapath unit between the host interface and the nonvolatile memory bus; generating an output that indicates a current operation of the first datapath unit; and in response to the output, changing priority of contexts of the second queue of contexts for the second datapath unit.

The output may be sent directly from the first datapath unit to the second datapath unit. The output may be sent from the first datapath unit to a datapath control unit that is in communication with the first datapath unit and the second datapath unit, the datapath control unit managing context prioritization for the first datapath unit and the second datapath unit. The datapath control unit may manage context prioritization by maintaining a weighted table of commands, priorities of contexts associated with commands changing according to weighting of their respective commands. The output may indicate that the first datapath unit is acting on data in response to a host read command and weighting associated with the host read command may be modified to prioritize contexts associated with the host read command in the second queue of contexts for the second datapath unit. Modification of the weighting associated with the host read command may also prioritize contexts associated with the host read command in at least a third queue of contexts for a third datapath unit in series with the first and second datapath units. The first datapath unit may be a flash interface module that is connected to the nonvolatile memory bus, the second datapath unit may be an Error Correction Code (ECC) machine, and the third datapath unit may be one of: an Exclusive OR (XOR) unit, or a data encryption/decryption unit. The output may indicate that the first datapath unit is acting on data in response to a host write command and weighting associated with the host write command may be modified to prioritize contexts associated with the host write command in the second queue of contexts for the second datapath unit. The first datapath unit may be a host interface unit and the second datapath unit may be one of: an ECC machine, an XOR unit, or a data encryption/decryption unit. The output may indicate that a command should be weighted so that contexts associated with the command have lower or higher priority. The datapath control unit may apply a weighting scheme to provide data in sequential order to the host interface of the memory controller when the data is received out of sequential order from the nonvolatile memory bus. The datapath control unit may apply a weighting scheme to stream data from the host interface to the memory bus, or to stream data from the memory bus to the host interface. The datapath control unit may apply a time-based adjustment of weighting so that commands increase in priority according to the amount of time they remain uncompleted.

An example of a nonvolatile memory controller includes: a host interface; a memory bus; a first datapath unit between the host interface and the memory bus; a first context queue that contains contexts for the first datapath unit; a second datapath unit connected in series with the first datapath unit between the host interface and the memory bus; a second context queue that contains contexts for the second datapath unit; and a datapath control unit connected to the first datapath unit and the second datapath unit, the datapath control unit prioritizing contexts in the first and second context queues for the first and second datapath units.

The datapath control unit may include a tag cache that contains entries corresponding to commands, each entry having a weighting that indicates priority of corresponding contexts in the first and second context queues. The tag cache may be formed by a Content Addressable Memory (CAM). The first datapath unit may be a nonvolatile memory interface unit and the second datapath unit may be an Error Correction Code (ECC) unit. A third datapath unit may be connected in series with the first and second datapath units between the host interface and the memory bus. The at least a third datapath unit may include at least one of: (a) an Exclusive OR (XOR) unit, or (b) an encryption unit. A first set of data buffers may be connected to the first datapath unit and a second set of data buffers may be connected to the second set of datapath unit. The memory bus may be a NAND flash memory bus. The memory bus may be a three-dimensional nonvolatile memory bus.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

Memory System

Figure 1:
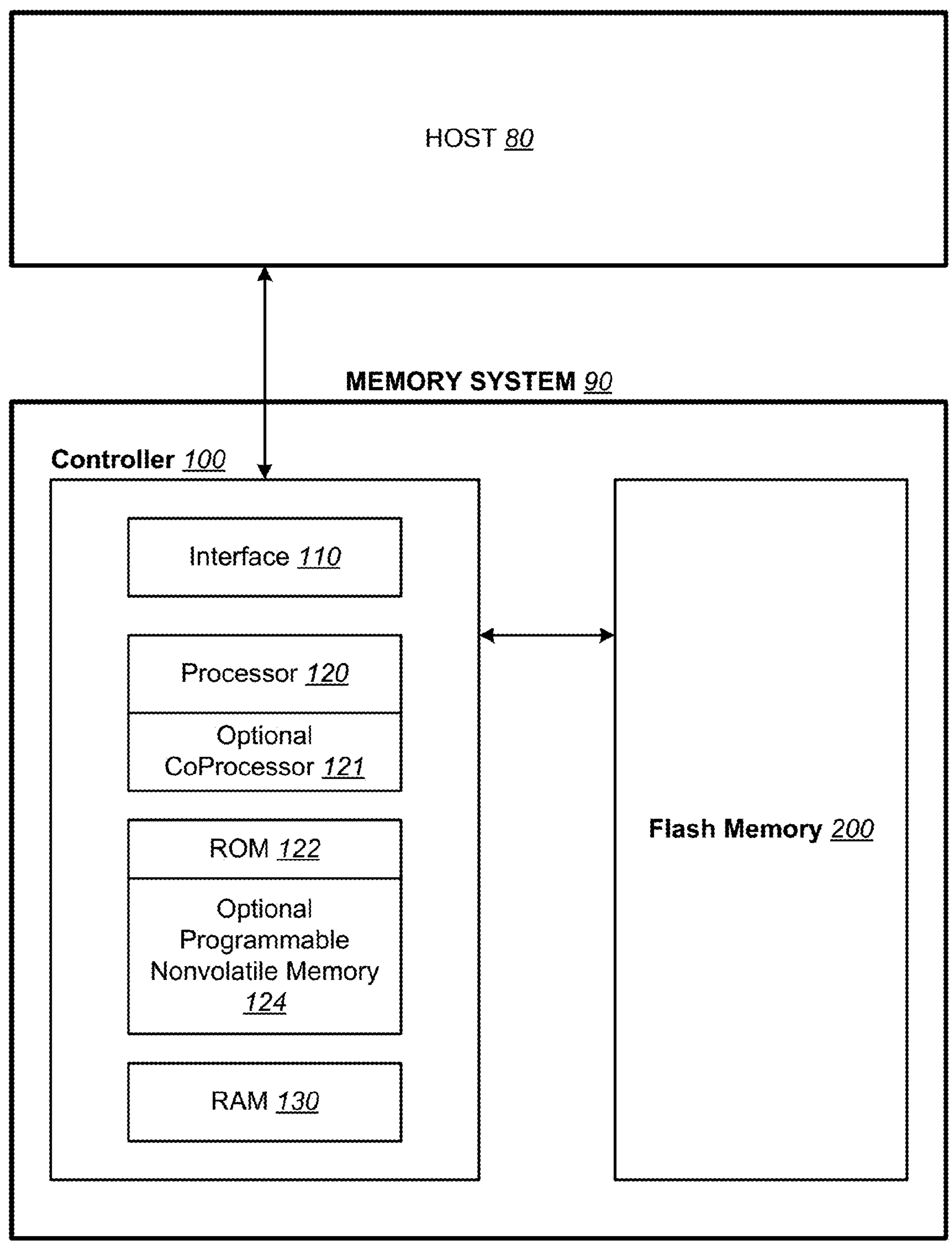
FIG. 1 illustrates schematically the main hardware components of a memory system suitable for implementing the present invention.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Furthermore, each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or such that each element is individually accessible. By way of non-limiting example, NAND devices contain memory elements (e.g., devices containing a charge storage region) connected in series. For example, a NAND memory array may be configured so that the array is composed of multiple strings of memory in which each string is composed of multiple memory elements sharing a single bit line and accessed as a group. In contrast, memory elements may be configured so that each element is individually accessible, e.g., a NOR memory array. One of skill in the art will recognize that the NAND and NOR memory configurations are exemplary, and memory elements may be otherwise configured.

The semiconductor memory elements of a single device, such as elements located within and/or over the same substrate or in a single die, may be distributed in two or three dimensions, such as a two dimensional array structure or a three dimensional array structure.

In a two dimensional memory structure, the semiconductor memory elements are arranged in a single plane or single memory device level. Typically, in a two dimensional memory structure, memory elements are located in a plane (e.g., in an x-z direction plane) which extends substantially parallel to a major surface of a substrate that supports the memory elements. The substrate may be a wafer over which the layers of the memory elements are deposited and/or in which memory elements are formed or it may be a carrier substrate which is attached to the memory elements after they are formed.

The memory elements may be arranged in the single memory device level in an ordered array, such as in a plurality of rows and/or columns. However, the memory elements may be arranged in non-regular or non-orthogonal configurations as understood by one of skill in the art. The memory elements may each have two or more electrodes or contact lines, such as bit lines and word lines.

A three dimensional memory array is organized so that memory elements occupy multiple planes or multiple device levels, forming a structure in three dimensions (i.e., in the x, y and z directions, where the y direction is substantially perpendicular and the x and z directions are substantially parallel to the major surface of the substrate).

As a non-limiting example, each plane in a three dimensional memory array structure may be physically located in two dimensions (one memory level) with multiple two dimensional memory levels to form a three dimensional memory array structure. As another non-limiting example, a three dimensional memory array may be physically structured as multiple vertical columns (e.g., columns extending substantially perpendicular to the major surface of the substrate in the y direction) having multiple elements in each column and therefore having elements spanning several vertically stacked memory planes. The columns may be arranged in a two dimensional configuration, e.g., in an x-z plane, thereby resulting in a three dimensional arrangement of memory elements. One of skill in the art will understand that other configurations of memory elements in three dimensions will also constitute a three dimensional memory array.

By way of non-limiting example, in a three dimensional NAND memory array, the memory elements may be connected together to form a NAND string within a single horizontal (e.g., x-z) plane. Alternatively, the memory elements may be connected together to extend through multiple horizontal planes. Other three dimensional configurations can be envisioned wherein some NAND strings contain memory elements in a single memory level while other strings contain memory elements which extend through multiple memory levels. Three dimensional memory arrays may also be designed in a NOR configuration and in a ReRAM configuration.

A monolithic three dimensional memory array is one in which multiple memory levels are formed above and/or within a single substrate, such as a semiconductor wafer. In a monolithic three dimensional array the layers of each level of the array are formed on the layers of each underlying level of the array. One of skill in the art will understand that layers of adjacent levels of a monolithic three dimensional memory array may be shared or have intervening layers between memory levels. In contrast, two dimensional arrays may be formed separately and then packaged together to form a non-monolithic memory device. For example, non-monolithic stacked memories have been constructed by forming memory levels on separate substrates and adhering the memory levels atop each other. The substrates may be thinned or removed from the memory levels before bonding, but as the memory levels are initially formed over separate substrates, such memories are not monolithic three dimensional memory arrays. Further, multiple two dimensional memory arrays or three dimensional memory arrays (monolithic or non-monolithic) may be formed separately and then packaged together to form a stacked-chip memory device.

One of skill in the art will recognize that this invention is not limited to the two dimensional and three dimensional exemplary structures described but cover all relevant memory structures within the spirit and scope of the invention as described herein and as understood by one of skill in the art.

FIG. 1 illustrates schematically the main hardware components of a memory system suitable for implementing the present invention. The memory system 90 typically operates with a host 80 through a host interface. The memory system is typically in the form of a memory card or an embedded memory system. The memory system 90 includes a memory 200 whose operations are controlled by a controller 100. The memory 200 comprises one or more array of non-volatile memory cells distributed over one or more integrated circuit chip. The controller 100 includes an interface 110, a processor 120, an optional coprocessor 121, ROM 122 (read-only-memory), RAM 130 (random access memory) and optionally programmable nonvolatile memory 124. The interface 110 has one component interfacing the controller to a host and another component interfacing to the memory 200. Firmware stored in nonvolatile ROM 122 and/or the optional nonvolatile memory 124 provides codes for the processor 120 to implement the functions of the controller 100. Error correction codes may be processed by the processor 120 or the optional coprocessor 121. In an alternative embodiment, the controller 100 is implemented by a state machine (not shown.) In yet another embodiment, the controller 100 is implemented within the host.

Physical Memory Structure

Figure 2:
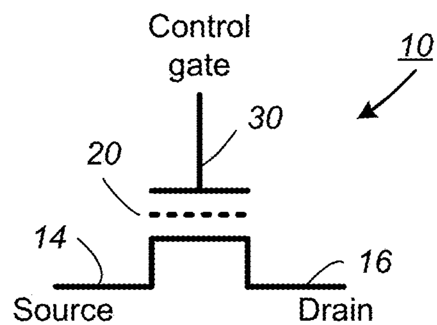
FIG. 2 illustrates schematically a non-volatile memory cell.

FIG. 2 illustrates schematically a non-volatile memory cell. The memory cell 10 can be implemented by a field-effect transistor having a charge storage unit 20, such as a floating gate or a dielectric layer. The memory cell 10 also includes a source 14, a drain 16, and a control gate 30.

There are many commercially successful non-volatile solid-state memory devices being used today. These memory devices may employ different types of memory cells, each type having one or more charge storage element.

Typical non-volatile memory cells include EEPROM and flash EEPROM. Examples of EEPROM cells and methods of manufacturing them are given in U.S. Pat. No. 5,595,924. Examples of flash EEPROM cells, their uses in memory systems and methods of manufacturing them are given in U.S. Pat. Nos. 5,070,032, 5,095,344, 5,315,541, 5,343,063, 5,661,053, 5,313,421 and 6,222,762. In particular, examples of memory devices with NAND cell structures are described in U.S. Pat. Nos. 5,570,315, 5,903,495, 6,046,935. Also, examples of memory devices utilizing dielectric storage elements have been described by Eitan et al., "NROM: A Novel Localized Trapping, 2-Bit Nonvolatile Memory Cell," IEEE Electron Device Letters, vol. 21, no. 11, November 2000, pp. 543-545, and in U.S. Pat. Nos. 5,768,192 and 6,011,725.

In practice, the memory state of a cell is usually read by sensing the conduction current across the source and drain electrodes of the cell when a reference voltage is applied to the control gate. Thus, for each given charge on the floating gate of a cell, a corresponding conduction current with respect to a fixed reference control gate voltage may be detected. Similarly, the range of charge programmable onto the floating gate defines a corresponding threshold voltage window or a corresponding conduction current window.

Alternatively, instead of detecting the conduction current among a partitioned current window, it is possible to set the threshold voltage for a given memory state under test at the control gate and detect if the conduction current is lower or higher than a threshold current (cell-read reference current). In one implementation the detection of the conduction current relative to a threshold current is accomplished by examining the rate the conduction current is discharging through the capacitance of the bit line.

Figure 3:
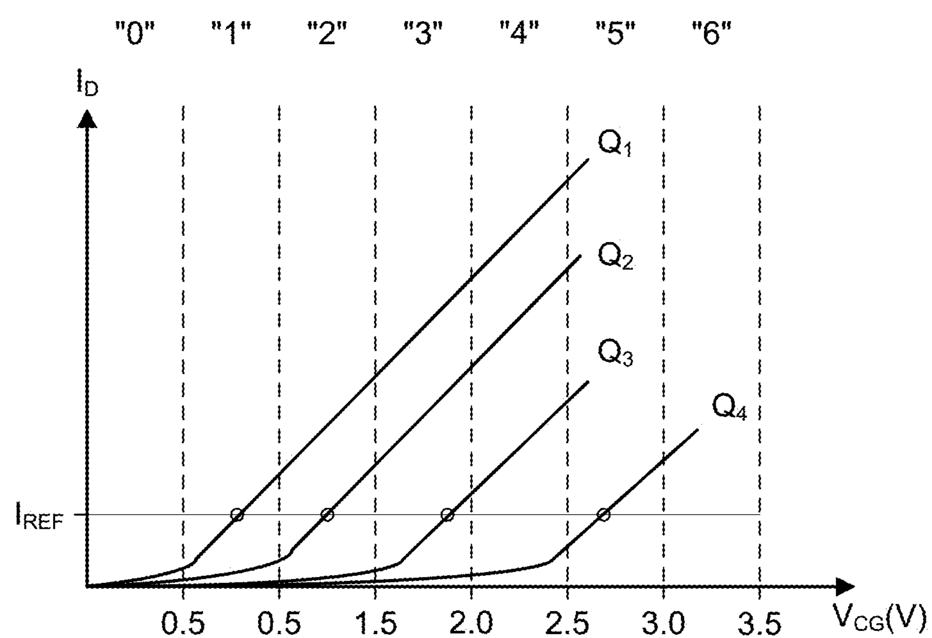
FIG. 3 illustrates the relation between the source-drain current $I_D$ and the control gate voltage $V_{CG}$ for four different charges Q1-Q4 that the floating gate may be selectively storing at any one time at fixed drain voltage.

FIG. 3 illustrates the relation between the source-drain current $I_D$ and the control gate voltage $V_{CG}$ for four different charges Q1-Q4 that the floating gate may be selectively storing at any one time. With fixed drain voltage bias, the four solid $I_D$ versus $V_{CG}$ curves represent four possible charge levels that can be programmed on a floating gate of a memory cell, respectively corresponding to four possible memory states. As an example, the threshold voltage window of a population of cells may range from 0.5V to 3.5V. Seven possible programmed memory states "0", "1", "2", "3", "4", "5", "6", respectively and one erased state (not shown) may be demarcated by partitioning the threshold window into regions in intervals of 0.5V each. For example, if a reference current, IREF of 2 μA is used as shown, then the cell programmed with Q1 may be considered to be in a memory state "1" since its curve intersects with $I_{REF}$ in the region of the threshold window demarcated by VCG=0.5V and 1.0V. Similarly, Q4 is in a memory state "5".

As can be seen from the description above, the more states a memory cell is made to store, the more finely divided is its threshold window. For example, a memory device may have memory cells having a threshold window that ranges from −1.5V to 5V. This provides a maximum width of 6.5V. If the memory cell is to store 16 states, each state may occupy from 200 mV to 300 mV in the threshold window. This will require higher precision in programming and reading operations in order to be able to achieve the required resolution.

Figure 4A:
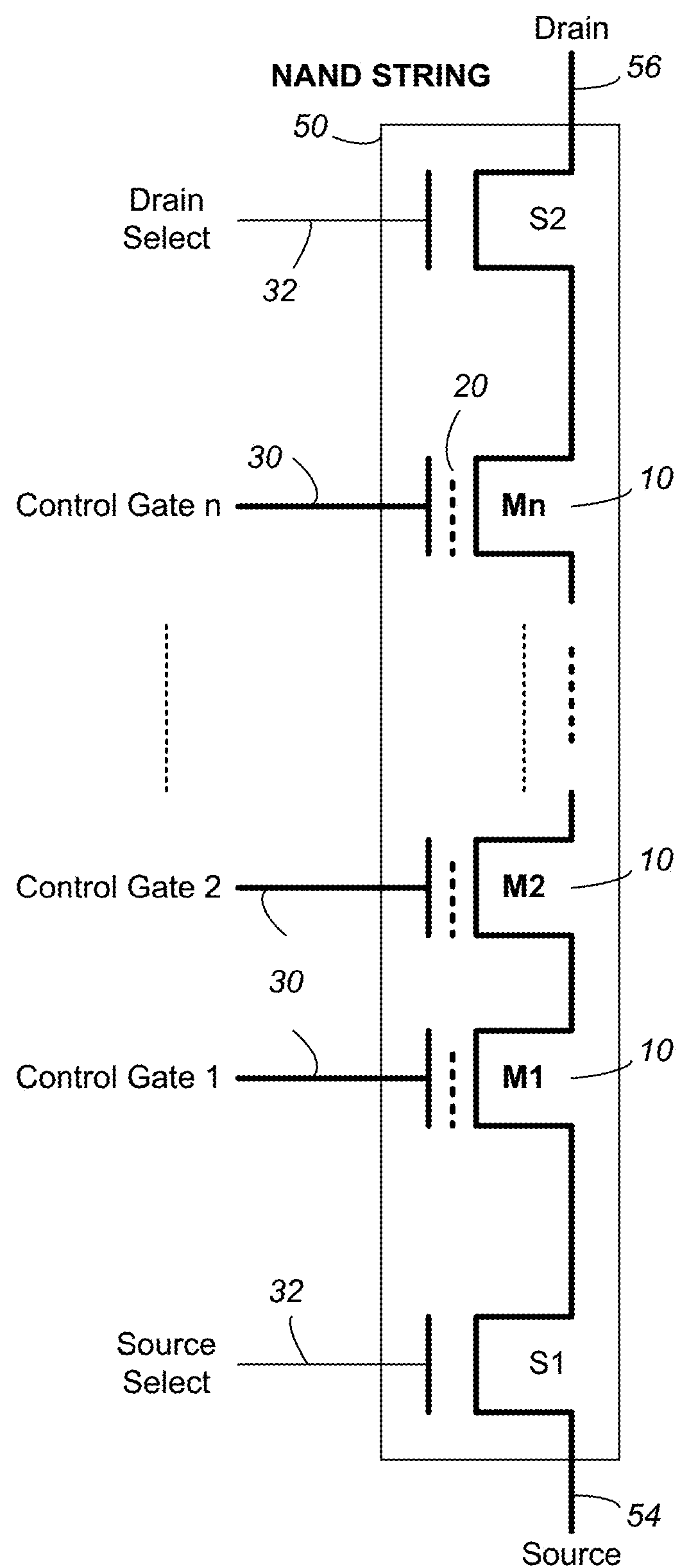
FIG. 4A illustrates schematically a string of memory cells organized into a NAND string.

FIG. 4A illustrates schematically a string of memory cells organized into a NAND string. A NAND string 50 comprises of a series of memory transistors M1, M2, . . . Mn (e.g., n=4, 8, 16 or higher) daisy-chained by their sources and drains. A pair of select transistors S1, S2 controls the memory transistor chain's connection to the external world via the NAND string's source terminal 54 and drain terminal 56 respectively. In a memory array, when the source select transistor S1 is turned on, the source terminal is coupled to a source line (see FIG. 4B). Similarly, when the drain select transistor S2 is turned on, the drain terminal of the NAND string is coupled to a bit line of the memory array. Each memory transistor 10 in the chain acts as a memory cell. It has a charge storage element 20 to store a given amount of charge so as to represent an intended memory state. A control gate 30 of each memory transistor allows control over read and write operations. As will be seen in FIG. 4B, the control gates 30 of corresponding memory transistors of a row of NAND string are all connected to the same word line. Similarly, a control gate 32 of each of the select transistors S1, S2 provides control access to the NAND string via its source terminal 54 and drain terminal 56 respectively. Likewise, the control gates 32 of corresponding select transistors of a row of NAND string are all connected to the same select line.

When an addressed memory transistor 10 within a NAND string is read or is verified during programming, its control gate 30 is supplied with an appropriate voltage. At the same time, the rest of the non-addressed memory transistors in the NAND string 50 are fully turned on by application of sufficient voltage on their control gates. In this way, a conductive path is effectively created from the source of the individual memory transistor to the source terminal 54 of the NAND string and likewise for the drain of the individual memory transistor to the drain terminal 56 of the cell.

Memory devices with such NAND string structures are described in U.S. Pat. Nos. 5,570,315, 5,903,495, 6,046,935.

Figure 4B:
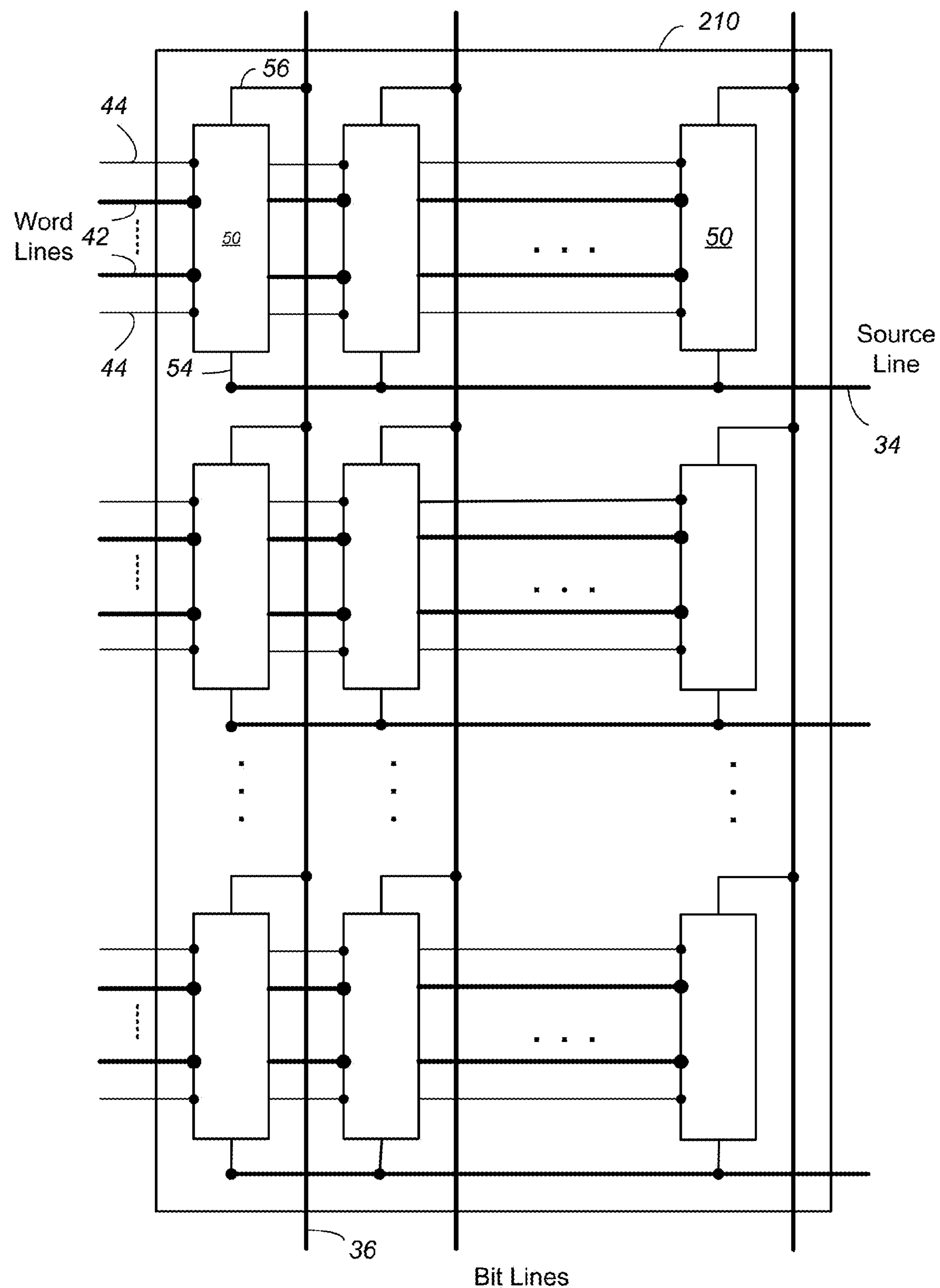
FIG. 4B illustrates an example of a NAND array 210 of memory cells, constituted from NAND strings 50 such as that shown in FIG. 4A.

FIG. 4B illustrates an example of a NAND array 210 of memory cells, constituted from NAND strings 50 such as that shown in FIG. 4A. Along each column of NAND strings, a bit line such as bit line 36 is coupled to the drain terminal 56 of each NAND string. Along each bank of NAND strings, a source line such as source line 34 is coupled to the source terminals 54 of each NAND string. Also the control gates along a row of memory cells in a bank of NAND strings are connected to a word line such as word line 42. The control gates along a row of select transistors in a bank of NAND strings are connected to a select line such as select line 44. An entire row of memory cells in a bank of NAND strings can be addressed by appropriate voltages on the word lines and select lines of the bank of NAND strings.

Figure 5:
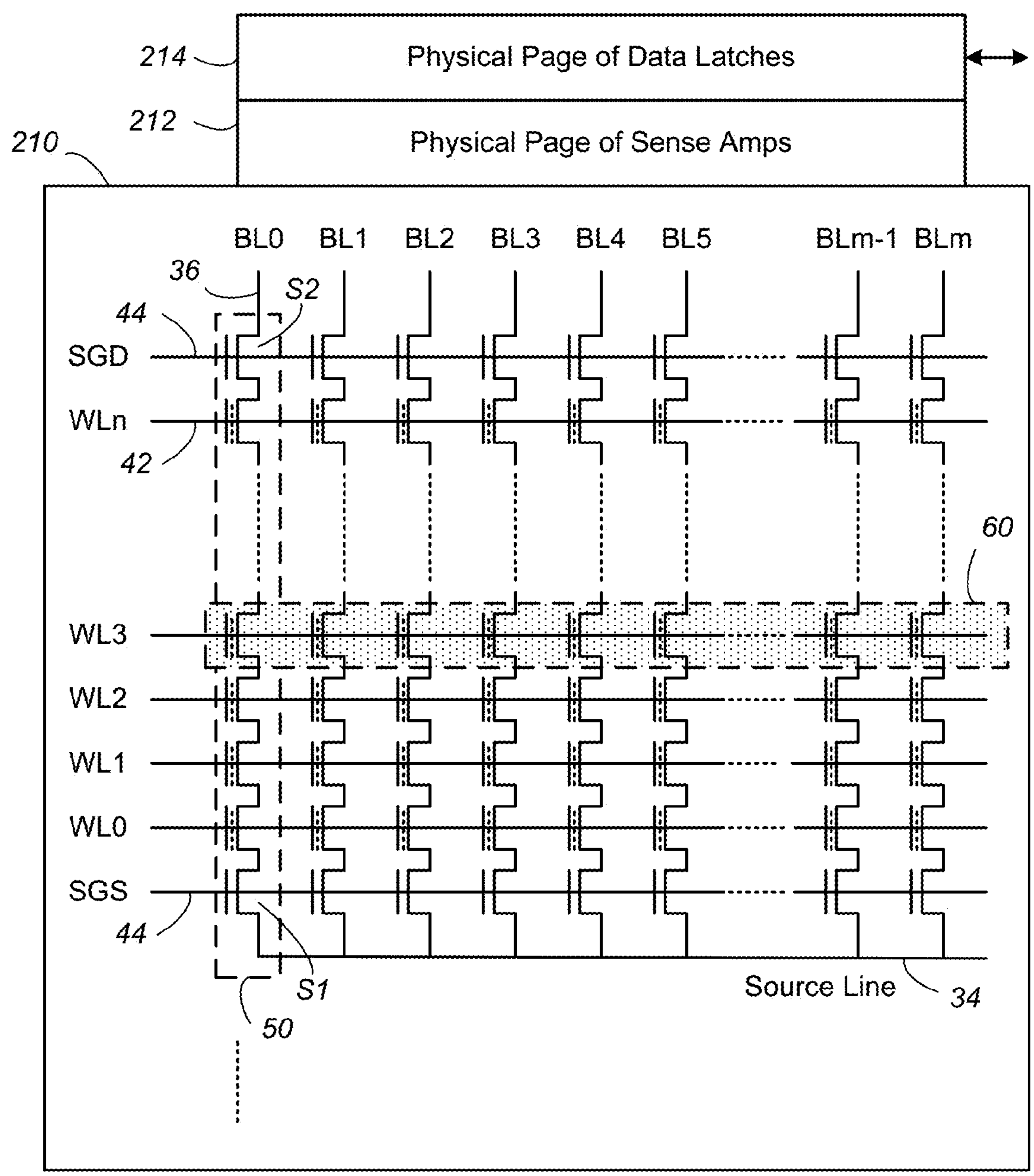
FIG. 5 illustrates a page of memory cells, organized in the NAND configuration, being sensed or programmed in parallel.

FIG. 5 illustrates a page of memory cells, organized in the NAND configuration, being sensed or programmed in parallel. FIG. 5 essentially shows a bank of NAND strings 50 in the memory array 210 of FIG. 4B, where the detail of each NAND string is shown explicitly as in FIG. 4A. A physical page, such as the page 60, is a group of memory cells enabled to be sensed or programmed in parallel. This is accomplished by a corresponding page of sense amplifiers 212. The sensed results are latched in a corresponding set of latches 214. Each sense amplifier can be coupled to a NAND string via a bit line. The page is enabled by the control gates of the cells of the page connected in common to a word line 42 and each cell accessible by a sense amplifier accessible via a bit line 36. As an example, when respectively sensing or programming the page of cells 60, a sensing voltage or a programming voltage is respectively applied to the common word line WL3 together with appropriate voltages on the bit lines.

Physical Organization of the Memory

One important difference between flash memory and other of types of memory is that a cell must be programmed from the erased state. That is the floating gate must first be emptied of charge. Programming then adds a desired amount of charge back to the floating gate. It does not support removing a portion of the charge from the floating gate to go from a more programmed state to a lesser one. This means that update data cannot overwrite existing one and must be written to a previous unwritten location.

Furthermore erasing is to empty all the charges from the floating gate and generally takes appreciable time. For that reason, it will be cumbersome and very slow to erase cell by cell or even page by page. In practice, the array of memory cells is divided into a large number of blocks of memory cells. As is common for flash EEPROM systems, the block is the unit of erase. That is, each block contains the minimum number of memory cells that are erased together. While aggregating a large number of cells in a block to be erased in parallel will improve erase performance, a large size block also entails dealing with a larger number of update and obsolete data.

Each block is typically divided into a number of physical pages. A logical page is a unit of programming or reading that contains a number of bits equal to the number of cells in a physical page. In a memory that stores one bit per cell, one physical page stores one logical page of data. In memories that store two bits per cell, a physical page stores two logical pages. The number of logical pages stored in a physical page thus reflects the number of bits stored per cell. In one embodiment, the individual pages may be divided into segments and the segments may contain the fewest number of cells that are written at one time as a basic programming operation. One or more logical pages of data are typically stored in one row of memory cells. A page can store one or more sectors. A sector includes user data and overhead data.

An alternative arrangement to a conventional two-dimensional (2-D) NAND array is a three-dimensional (3-D) array. In contrast to 2-D NAND arrays, which are formed along a planar surface of a semiconductor wafer, 3-D arrays extend up from the wafer surface and generally include stacks, or columns, of memory cells extending upwards. Various 3-D arrangements are possible. In one arrangement a NAND string is formed vertically with one end (e.g. source) at the wafer surface and the other end (e.g. drain) on top. In another arrangement a NAND string is formed in a U-shape so that both ends of the NAND string are accessible on top, thus facilitating connections between such strings. Examples of such NAND strings and their formation are described in U.S. Patent Publication Number 2012/0220088 and in U.S. Patent Publication Number 2013/0107628, which are hereby incorporated by reference in their entirety. In general, operation of 3-D NAND arrays is similar to operation of 2-D NAND arrays and 3-D NAND arrays may be operated as SLC or MLC memories.

All-Bit, Full-Sequence MLC Programming

Figure 6A:
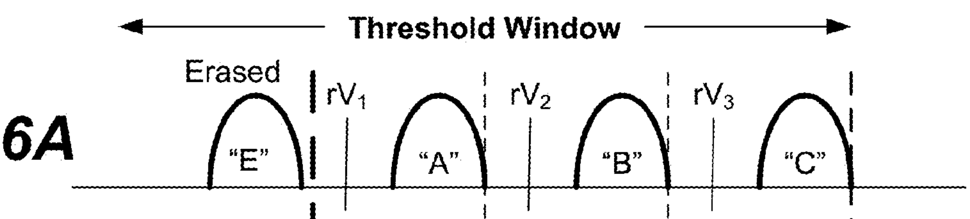
FIGS. 6A-6C illustrate an example of programming a population of 4-state memory cells.
Figure 6B:
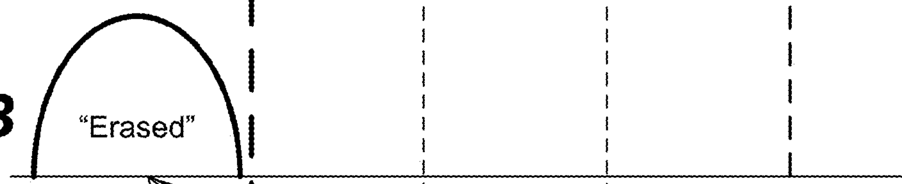
Figure 6C:
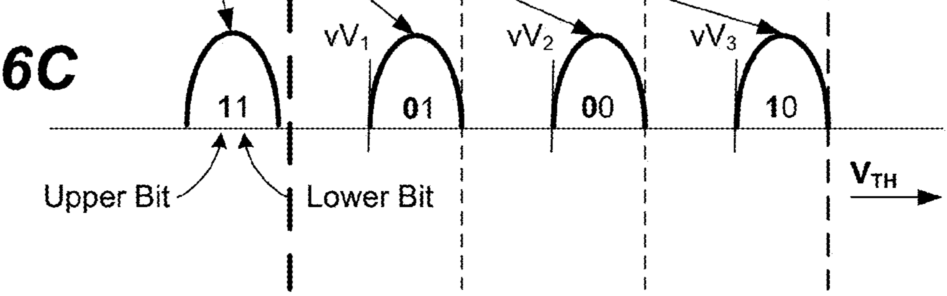

FIG. 6A-6C illustrate an example of programming a population of 4-state memory cells. FIG. 6A illustrates the population of memory cells programmable into four distinct distributions of threshold voltages respectively representing memory states "E", "A", "B" and "C". FIG. 6A illustrates the initial distribution of "erased" threshold voltages for an erased memory. FIG. 613 illustrates an example of the memory after many of the memory cells have been programmed. Essentially, a cell initially has an "erased" threshold voltage and programming will move it to a higher value into one of the three zones demarcated by verify levels $vV_1$, $vV_2$ and $vV_3$. In this way, each memory cell can be programmed to one of the three programmed states "A", "B" and "C" or remain un-programmed in the "erased" state. As the memory gets more programming, the initial distribution of the "erased" state as shown in FIG. 6C will become narrower and the erased state is represented by the "0" state.

A 2-bit code having a lower bit and an upper bit can be used to represent each of the four memory states. For example, the "E", "A", "B" and "C" states are respectively represented by "11", "01", "00" and '10". The 2-bit data may be read from the memory by sensing in "full-sequence" mode where the two bits are sensed together by sensing relative to the read demarcation threshold values $rV_1$, $rV_2$ and $rV_3$ in three sub-passes respectively.

Memory Systems

In many memory systems, multiple memory dies, or memory chips, are connected to a memory controller through a shared memory bus so that they can be efficiently managed as part of large-scale memory system. For example, four, eight, or sixteen memory dies may be connected to such a bus. A memory controller may have more than one such bus, e.g. a memory controller may manage eight or sixteen busses, each with eight or sixteen dies. The numbers of dies and busses in such arrangements may be very large, for example in Solid State Drives (SSDs) which are often used for mass storage applications. Aspects of the present invention may be applied to such arrangements regardless of the number of busses or the number of dies per bus. Memory dies in such systems may be planar NAND, 3-D memory (including charge-storage memories and resistive memories), or other types of memory.

A memory controller may access memory dies on a shared bus to provide a high degree of parallelism, for example by striping data across dies so that while one or more die is busy writing data from an on-chip buffer to nonvolatile memory cells, subsequent data is being sent to another die. Individual memory dies may perform various on-chip operations without occupying the memory bus so that the memory bus may be efficiently shared. However, efficient management of multiple dies can become quite complex as data is spread across multiple dies on one or more busses.

Figure 7:
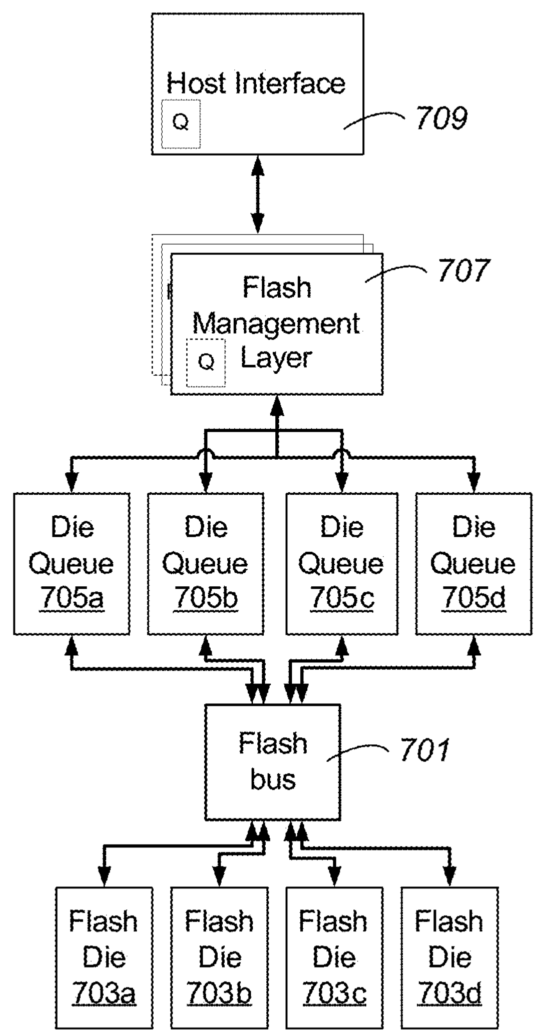
FIG. 7 illustrates a memory system including multiple dies connected to a memory controller by a memory bus.

FIG. 7 shows an arrangement in which a flash memory bus 701 is shared by four flash memory dies 703*a-d* (examples provided here largely refer to flash memory, but it will be understood that aspects of the disclosure may apply to various forms of nonvolatile memory). Four die queues 705*a-d* are maintained, corresponding to the four flash dies. Each queue contains contexts for a corresponding die, where a context is an instruction for a particular die to perform a task (e.g. execution of a host command such as a host write command may generate multiple contexts per die for multiple dies). A flash management layer 707 manages access to the dies by selecting contexts from corresponding die queues so that data is moved efficiently between the flash dies and a host interface 709.

In some memory controllers, data that is being transferred between a host interface and a memory bus may be subject to some operations while in the memory controller. For example it is common to use Error Correction Code (ECC) to encode data that is received from a host prior to storage in a memory array. The data may later be decoded when it is read out from the memory array and errors may be detected and corrected. Examples of codes used include Reed-Solomon code, Hamming code, BCH, and Low Density Parity Check (LDPC). It is also common to apply Exclusive OR (XOR) operations to portions of data prior to storage so that if one such portion of data becomes corrupted (e.g. uncorrectable by ECC) then it may be recovered by XORing other portions of data and stored XOR output. In some memory systems, data may be randomized or scrambled prior to storage (and descrambled after reading from the memory array). Data may also be encrypted prior to storage and alter decrypted when it is read. Various other logical operations may be used in particular memory systems. Data may travel along a datapath between a host interface and a memory bus (in either direction) through multiple datapath units, each datapath unit performing a different operation on the data.

In a simple arrangement, sufficient dedicated datapath units are provided for each memory bus to process all data between the memory bus and the host interface. Such a static arrangement is relatively simple to design and manage. However, it may be more efficient to share datapath units between busses (e.g. by using one ECC engine for two or more busses) in a more dynamic arrangement. Each datapath unit may have its own queue, or queues, of contexts so that each acts somewhat independently according to their respective queues. Each queue may contain contexts relating to different operations in different dies (which may be on the same bus or on different busses). Datapath units may process such contexts according to some algorithm (e.g. round-robin from die to die). Some datapath units may be used for some data but not for other data (e.g. XORing may only be required if ECC fails). Some datapath units may have a fixed throughput (e.g. a given number of bytes per second) while others may have a variable throughput (e.g. throughput of an ECC machine may depend on the bit error rate of the data). Managing such resources in an efficient manner is challenging.

Figure 8:
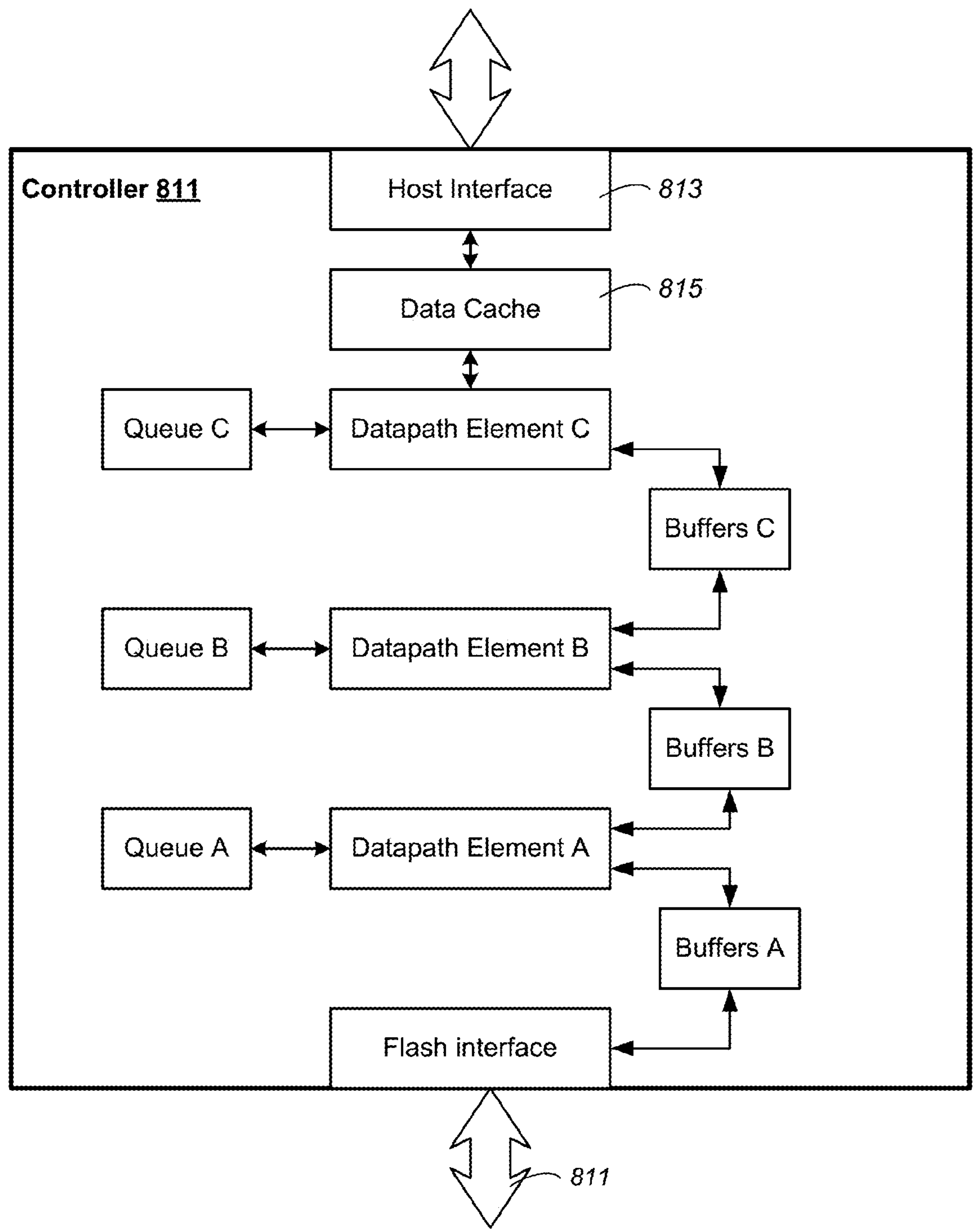
FIG. 8 illustrates a memory controller having multiple datapath units.

FIG. 8 shows an example of an arrangement in which datapath units A, B, and C are located between a memory bus 811 and a host interface 813 (a host interface may also be considered as a datapath unit as it is along the datapath between the memory bus and a host bus). A data cache 815 is connected to host interface 813. Each datapath unit has its respective queue (Queues A, B, and C, which may each include separate queues for different dies) and between datapath units are buffers (Buffers A, B, and C) for holding data that has been operated on by a preceding datapath unit and is awaiting a subsequent datapath unit. It will be understood that data travels in both directions along the datapath between the host and the memory dies (i.e. from host interface 813 to memory bus 811, and from memory bus 811 to host interface 813).

According to an aspect of the present invention, when a datapath unit selects a context from its queue for execution, it does not always do so blindly, without regard to operations of other datapath units. Instead, there is some communication between datapath units that allows coordination of datapath units so that they are more efficiently uses. For example, a datapath unit may send an output to one or more other datapath units indicating that it is currently operating on some data that is part of a data stream. A datapath unit receiving such an output, and that is downstream from the sender of the output, may then prioritize contexts associated with the data stream. Thus, a series of datapath units along a datapath may prioritize a data stream in response to an output from the first datapath unit along the datapath.

In another embodiment, a datapath control unit helps to prioritize contexts for multiple datapath units in a coordinated manner. Thus, instead of having each datapath unit independently operating on its own queue of contexts, datapath units may receive prioritization information from a datapath control unit and then determine an order of execution of contexts in its queue in light of the prioritization information. This maintains flexibility while providing coordination between datapath units.

Direct Communication

Figure 9A:
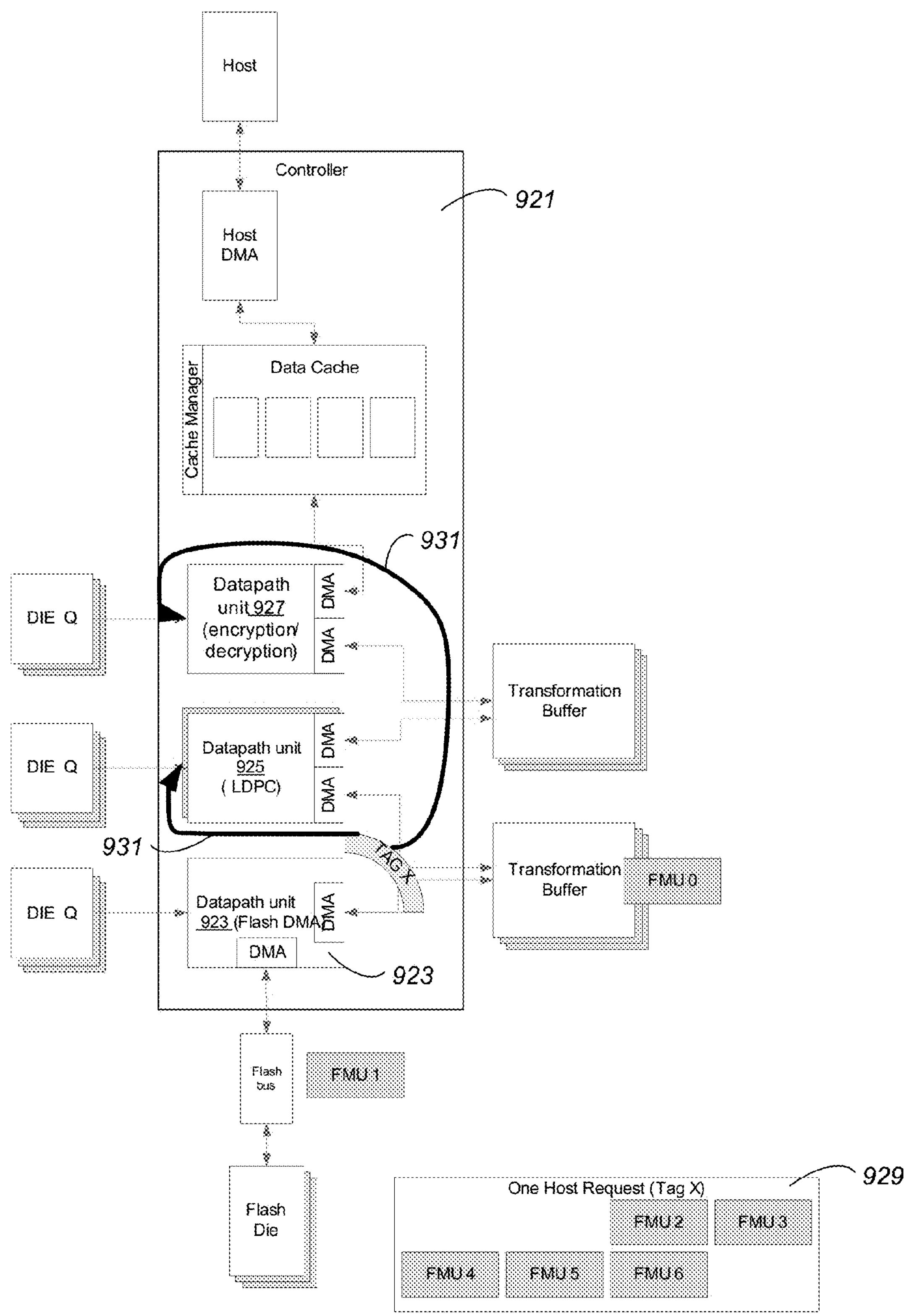
FIG. 9A illustrates operation of a broadcast command by a datapath unit to prioritize a data stream.

FIG. 9A shows an example of a memory controller 921 that includes three datapath units that are operated in a coordinated manner, a flash interface (flash DMA) 923, ECC machine (e.g. applying LDPC) 925, and an encryption/decryption machine 927. A host requests a portion of data consisting of a series of Flash Management Units (FMUs), where a FMU is the smallest readable unit of data and corresponds to an ECC word (i.e. FMUs can be individually read and decoded). FMUs 0-6 are requested in a host request (Tag X) 929. When the first datapath unit along the datapath, in this case flash DMA 923, operates on the first data unit (FMU 0), it broadcasts an output 931 that indicates that it is starting to process data in response to host request 929. Downstream datapath units 925, 927 may then prioritize contexts associated with host request 923 so that they rapidly process the corresponding data units (FMU 0-6) from buffers. This may mean deferring other contexts that are not related to host request 929.

The broadcast 931 does not require downstream datapath units to stop all other operations and become dedicated to the data for the host request 929 in this example. In some cases, a datapath unit may have the capacity to handle multiple threads without slowing down a particular thread. For example, where an ECC machine is shared among a large number of busses it may have sufficient capacity to perform ECC decoding for multiple busses at the same time by interleaving or otherwise sharing resources (i.e. it can process data at a speed equal to the data transfer rate of multiple busses). The broadcast output may be treated as a command that forces datapath units to act on data of for the host request, or alternatively may be treated as an indicator of priority that is not binding (i.e. that the datapath unit can ignore under certain conditions and is not forced to obey).

One problem with using a broadcast command relates to the tail of a stream of data. When the datapath unit that is the source of the output has finished operating on data associated with the host request it ceases sending the corresponding output. However, the tail of the data (i.e. the last data unit or units) may still be undergoing operations in other datapath units that are downstream of the source of the output. These datapath units may then cease prioritizing the data of the host request so that the pipeline formed by coordinated datapath units breaks up and there may be significant delay in processing the tail and returning the processed data to the host.

Figure 9B:
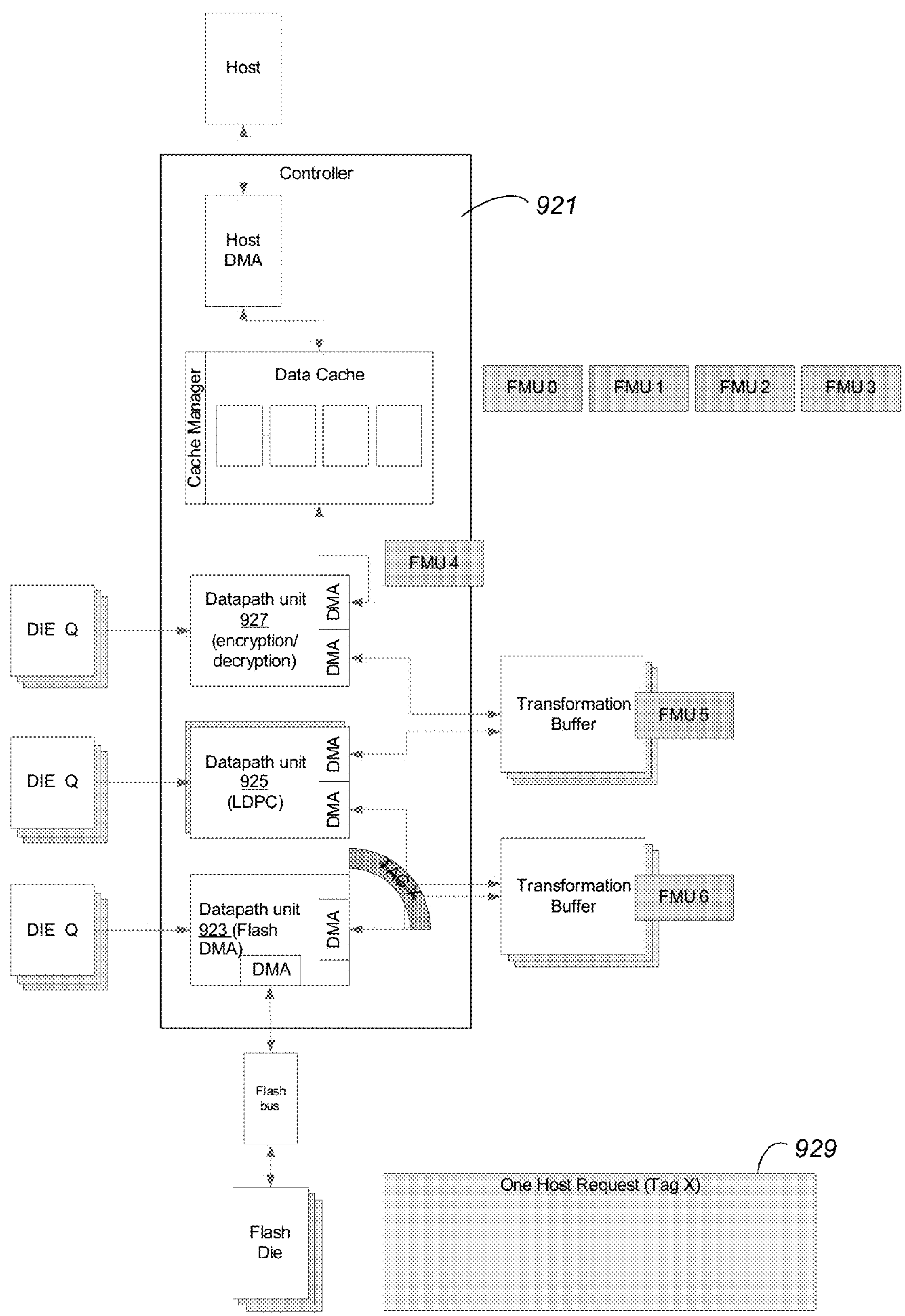
FIG. 9B illustrates a tail portion of the data stream of FIG. 9A passing along the datapath.

FIG. 9B shows the example of FIG. 9A at a point where the flash interface has finished FMU 6 and has transferred it to a buffer. Because there is no output broadcast to the ECC machine 925 or encryption/decryption unit 927, these datapath units may start other contexts that are not related to the data of the host command. FMU 6 is still awaiting processing by the ECC machine 925 and FMU 5 is awaiting processing by the encryption/decryption unit 927 (FMUs 0-3 are in cache awaiting transfer to the host). Delay in processing FMUs 5 and 6 may have significant impact on the overall time to complete the host request 929. Thus, this solution may not be ideal for all situations.

Datapath Control Unit

In an alternative arrangement, a datapath control unit provides some coordination between datapath units by providing information regarding prioritization which can be used by the datapath units in determining which context to execute. A datapath control unit, like datapath units, may be formed as a dedicated circuit or may be formed by firmware that configures a more general purpose circuit for its specific function.

Figure 10:
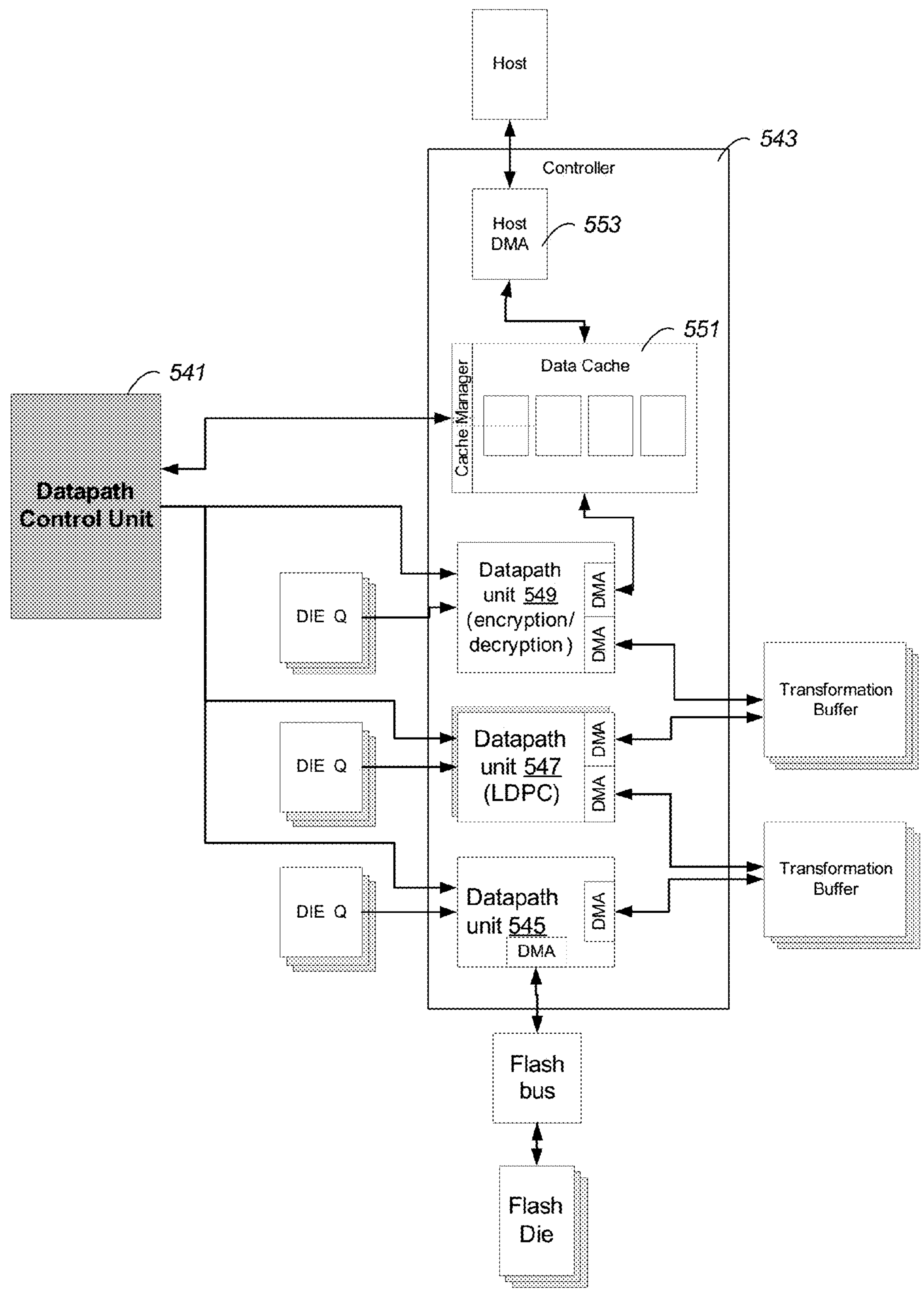
FIG. 10 illustrates a datapath control unit in communication with multiple datapath units.

FIG. 10 shows an example of a datapath control unit 541 that is in communication with three datapath units of a memory controller 543, a flash interface 545, ECC machine 547, and an encryption/decryption unit 549. Datapath control unit 541 is also in communication with a data cache 551 (and may be in communication with a host interface unit 553 and/or other components).

One application of a datapath control unit is to allow streaming of data without a tail effect as described with respect to a broadcast approach above. For example, in FIG. 10 the flash interface 545 may send an output to the datapath control unit 541 when it begins operating on the first unit of a host request. The datapath control unit 541 may then provide prioritization information to the other datapath units (547, 549) to indicate that a stream of data is coming through and should be prioritized. In this case, when the tail of the data stream passes through the flash interface, the data of the stream may continue to be prioritized so that the complete stream is returned to the host rapidly.

Figure 11:
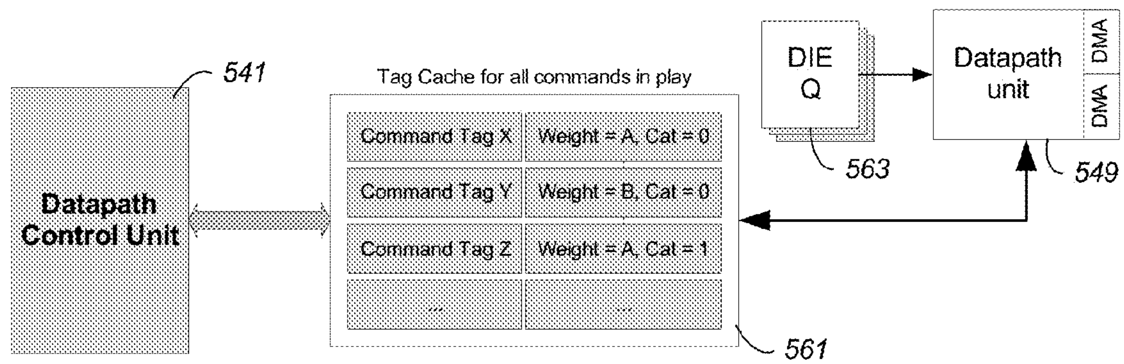
FIG. 11 illustrates a prioritization table maintained as a tag cache in CAM.

A datapath control unit may use any suitable technique for communicating prioritization information to datapath units. FIG. 11 shows an example in which datapath control unit 541 maintains a table 561 that contains priority information. Each line in the table includes a tag (e.g. Command tag X, Y, Z) that corresponds to a host command (e.g. read or write command) or controller operation. Each line also includes prioritization information in the form of weighting (e.g. weight=A, or B) and categorization information (e.g. cat=0 or 1). Each tag has a corresponding weight (which may be just a few bits) that indicates the priority of the corresponding command or operation indicated by the tag. Each tag is also assigned a category as either a host command or a controller operation. This allows separate treatment of host and controller operations in this example. It will be understood that different systems of prioritization may be used (e.g. separate host/controller categories may not be needed, more than two categories could be used to distinguish different types of commands, and weighting may have any number of levels, A, B, C, D, . . . etc.). Other information may also be stored in such a table in some cases.

A prioritization table may be maintained using any suitable hardware. In the present example, a Content Addressable Memory (CAM) is used, though a cache or RAM table, or other arrangement may also be suitable in some cases. Entries may be arranged in any suitable format including a linked list, linear organization tag, by weight, by category, or by some other information.

When a datapath unit (e.g. datapath unit 549) needs to determine which context to begin next, it may check its queue, or queues, 563 and see if there are contexts that are in condition for execution (e.g. data already in buffers etc.). If there are no contexts in condition for execution then the datapath unit may become idle. If there is only one context in condition for execution then the datapath unit may start executing it. If there are two or more contexts that are in condition for execution then the datapath unit may refer to the prioritization table 561 to determine which context to execute first. Each context corresponds to a host command or controller operation that has a corresponding tag entry in the prioritization table 561 so that the prioritization can easily be looked up. A CAM facilitates rapid lookup of such information.

Prioritization Schemes

A datapath control unit may apply a prioritization scheme in order to efficiently move data along a datapath that includes multiple datapath units, each with a separate context queue. In the above example of a host read command, a high prioritization would be given to contexts associated with data that is read in response to the host read command so that the data travels rapidly from datapath unit to datapath unit (while other contexts may be put aside by being given relatively low priorities).

Figure 12A:
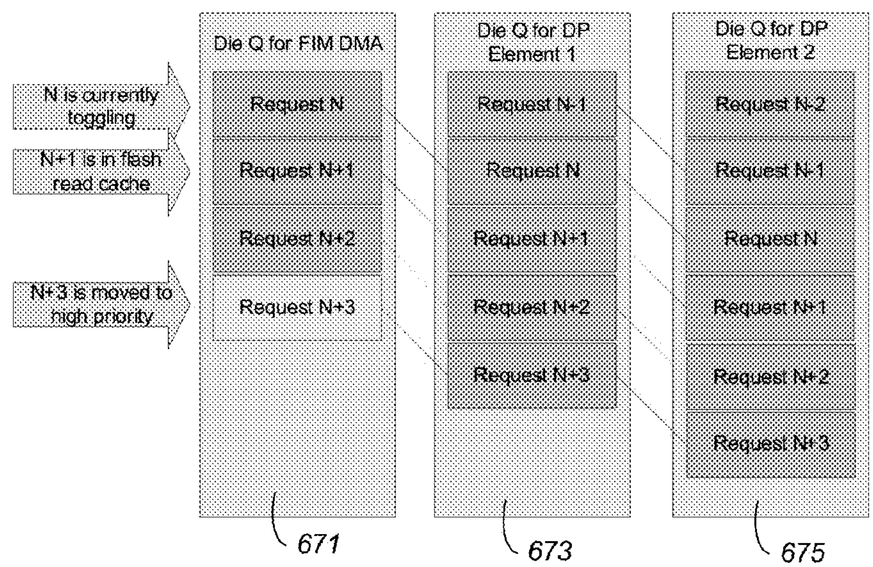
FIGS. 12A-C illustrate reordering of data along a datapath by a datapath control unit.
Figure 12B:
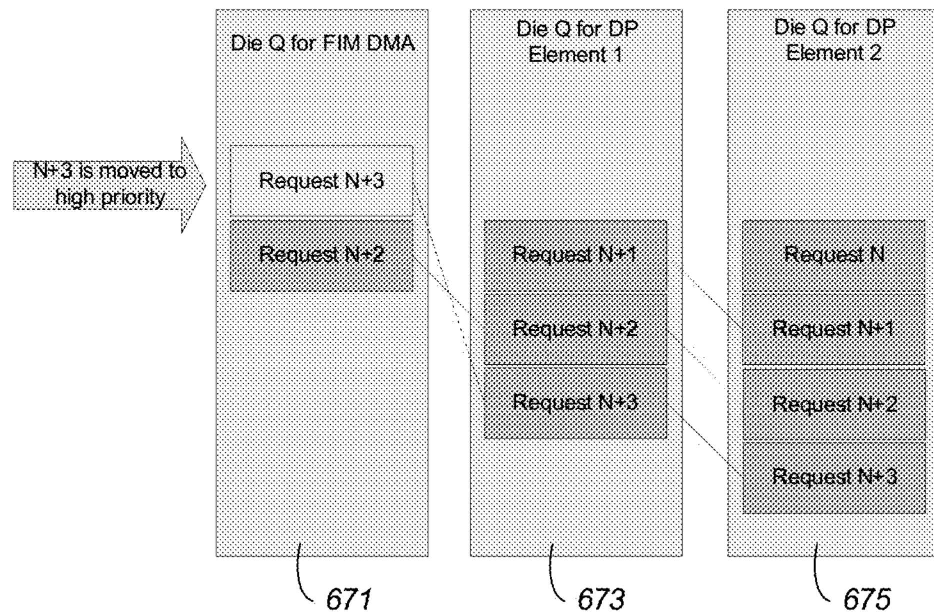
Figure 12C:
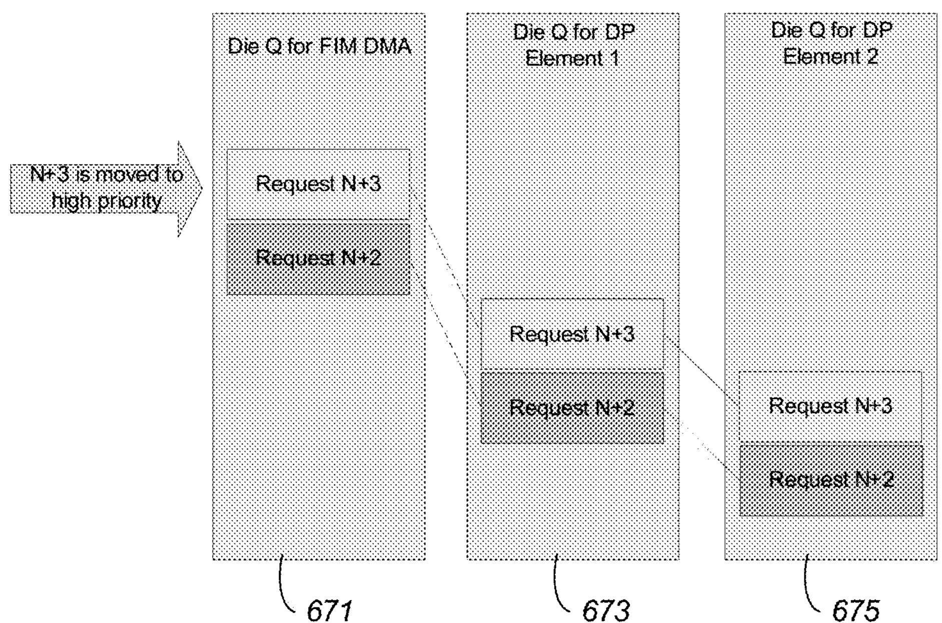

FIGS. 12A-12C show an example of a prioritization scheme that is used to reorder data between a memory bus and a host interface. Three queues 671, 673, 675, are shown for three successive datapath units along a datapath. The first queue 671 (queue for a flash interface) shows that a context corresponding to request N is executed and the corresponding data is toggled out to the next datapath unit (through buffers). Data corresponding to the next context, N+1, is in the flash read cache and is available to the flash interface. A context associated with Request N+3 is moved to a high priority in queue 671 at this point (e.g. by changing its weight as indicated by a prioritization table in datapath control unit CAM). Because data corresponding to request N+1 is already in flash read cache, this data is processed by the flash interface. However, Requests N+2 and N+3 have not started yet. The datapath unit may then determine that because of its higher priority, the data associated with Request N+3 should be operated on before data associated with Request N+2.

FIG. 12B shows how a context associated with data N+3 is operated on out of order in the first datapath unit. The datapath unit informs the datapath controller that it has changed the order and is proceeding with Request N+3.

FIG. 12C shows how a datapath control unit changes prioritization for queues of additional datapath units after the first datapath unit indicates that it is proceeding with N+3 and after prior data (e.g. N, N+1, etc.) is already processed by the additional datapath units. Thus, the prioritization change propagates along the datapath with data N+3 (rather than changing all along the datapath at once, which could cause disruption if other datapath units were still operating on earlier data). In this way, a datapath control unit can coordinate a change in prioritization in a safe manner. While the example of FIGS. 12A-C shows prioritization of contexts associated with a request N+3, it will be understood that this approach may be applied to any amount of data and may be used for a variety of reprioritization operations.

In one example, data that is received from a memory bus out-of-order may be reordered by a datapath control unit so that it reaches a data cache for the host interface in order and may be rapidly sent to the host. Some memory systems allow data to be read from memory dies out-of-order (e.g. skipping dies that are busy and reading opportunistically from available dies). This data may then be stored in data cache and sent to a host in order. However, this may require significant data cache and may reduce read performance. Reordering such data as it proceeds along a datapath between the memory bus and the data cache may reduce data cache usage and may improve read performance. In some memory systems, such as some SSDs, host bandwidth, or host bus bandwidth, may be lower than the cumulative memory system bandwidth so that saturating the host bus is important for good performance.

Figure 13:
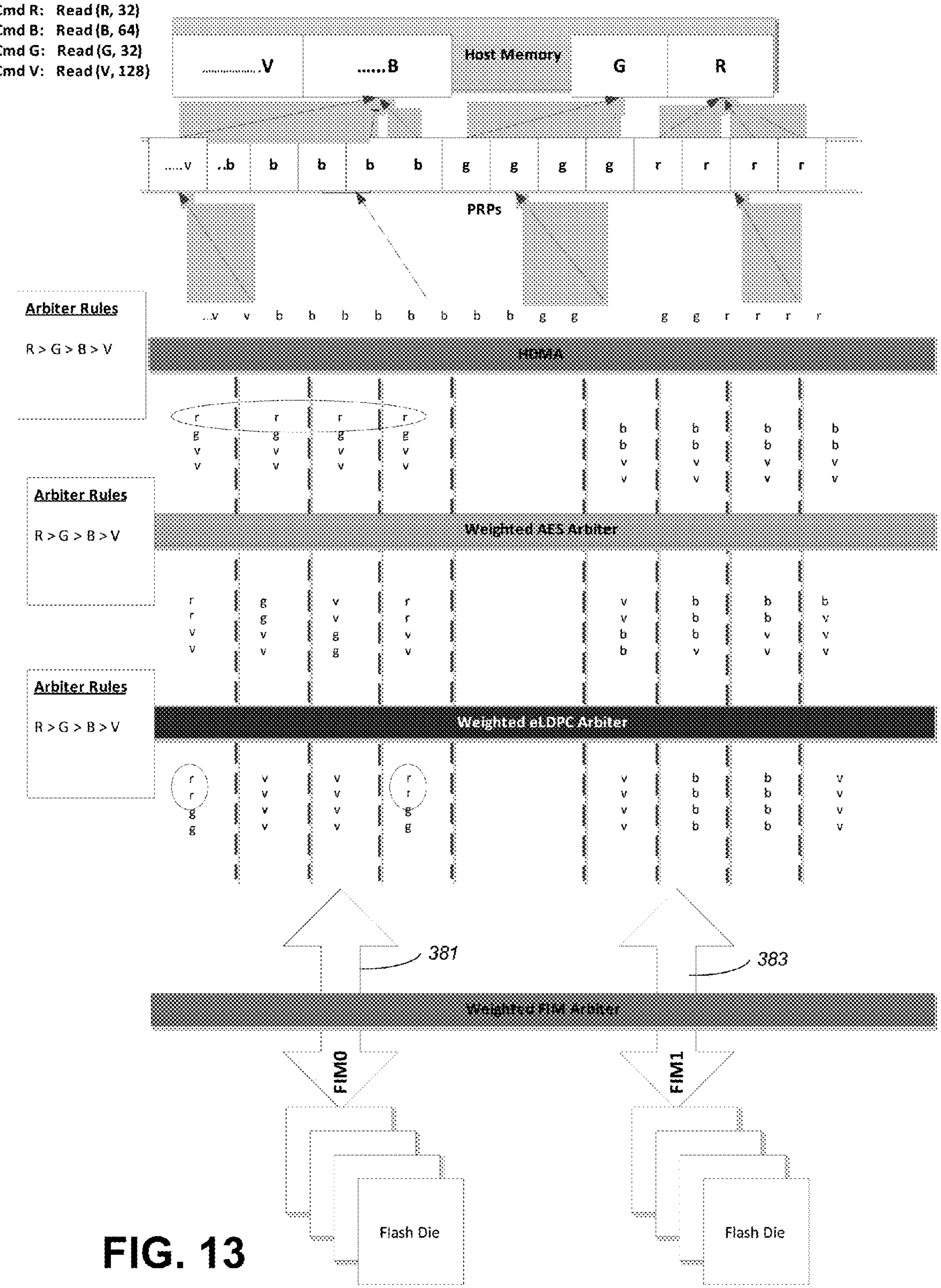
FIG. 13 illustrates reordering of data between a memory bus and a host interface.

FIG. 13 shows data in a memory system (e.g. SSD) passing through various datapath units along a datapath that serves two data busses 381, 383, each serving four memory dies. At each stage, the data is reordered based on priorities (weightings) associated with particular commands. Four read commands of different length are sent by the host R, B, G, and V. Corresponding data portions r, b, g, and v are read from the memory dies. The data portions are distributed across dies in a manner that requires serial access to particular dies to execute an individual read command. For example, execution of command R (32 KB) requires four read operations (8 KB each) but these reads are concentrated in two dies connected to memory bus 381 as indicated by circled data "r" entries in queues for the respective dies. In order to take advantage of parallelism, other data (for subsequent commands B and V) is read from other dies in parallel as indicated by corresponding entries in other queues. Data portions g are only read after data portions r because reading them requires access to the same dies. When data passes through an ECC machine (eLDPC) the order of the data is modified according to the prioritization order R>G>B>V. The data is modified again according to the same prioritization when passing through an encryption/decryption (AES) unit, and again when passing through a host interface unit (HDMA). Thus, data portions r rise in order as the data passes through datapath units and data portions g similarly rise, while data portions b and v drop down in order. While data may not be ordered in the exact order of host commands at the end of a series of such reordering steps, the change in order may be sufficient to provide performance improvement.

While examples above refer to increasing priority of certain operations, in some cases it may be efficient to reduce priority of certain operations. For example, where a particular command is going to be delayed for some reason, contexts associated with the delayed command may be reduced in priority because executing them rapidly will not reduce the time for execution of the command. For example, if access to a particular die is required in order to complete execution of a command, and the die is likely to be busy for an extended period of time, then there may be little benefit, or no benefit, in completing contexts associated with the command rapidly. Instead, they may be completed as low-priority contexts as resources allow.

In some cases, data is first stored in binary form (one bit per cell) and then "folded" into MLC format (two or more bits per cell). This allows data to be stored rapidly initially and then later, when time is less critical, to be copied into a more space-efficient format. Examples of folding are described in U.S. Pat. Nos. 8,144,512 and 8,468,294, which are hereby incorporated by reference in their entirety. Folding of data may take an extended period of time so that when folding is carried out in a particular die then the die becomes unavailable for an extended period so that commands that require access to the die may be lowered in priority.

In some cases, there is a danger that low priority commands or controller operations may remain unexecuted because available resources are continuously in use for high priority commands. This may be undesirable. For example, certain housekeeping operations (e.g. garbage collection) may not be urgent but if not performed may result in poor performance. According to an example, commands increase in priority as they remain uncompleted over time. A timer may be used to determine how long a command has remained uncompleted, or the number of other commands completed may be counted, or some other mechanism may be used to increment weights to ensure that commands rise in priority the longer they remain uncompleted.

CONCLUSION

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

It is claimed:

1. A method of operating a nonvolatile memory controller comprising:

maintaining a first queue of contexts for a first datapath unit that acts on data between a host interface of the memory controller and a nonvolatile memory bus;

maintaining a second queue of contexts for a second datapath unit that acts on data in series with the first datapath unit between the host interface and the nonvolatile memory bus;

generating an output that indicates a current operation of the first datapath unit, the output sent from the first datapath unit during the current operation; and in response to the output, changing priority of contexts of the second queue of contexts for the second datapath unit.

2. The method of claim 1 wherein the output is broadcast directly from the first datapath unit to the second datapath unit and to at least a third datapath unit that acts on data in series with the first and second datapath units.

3. The method of claim 1 wherein the output is sent from the first datapath unit to a datapath control unit that is in communication with the first datapath unit and the second datapath unit, the datapath control unit managing context prioritization for the first datapath unit and the second datapath unit.

4. The method of claim 3 wherein the datapath control unit manages context prioritization by maintaining a weighted table of commands, priorities of contexts associated with commands changing according to weighting of their respective commands.

5. The method of claim 3 wherein the output indicates that the first datapath unit is acting on data in response to a host read command and wherein weighting associated with the host read command is modified to prioritize contexts associated with the host read command in the second queue of contexts for the second datapath unit.

6. The method of claim 5 wherein modification of the weighting associated with the host read command also prioritizes contexts associated with the host read command in at least a third queue of contexts for a third datapath unit in series with the first and second datapath units.

7. The method of claim 6 wherein the first datapath unit is a flash interface module that is connected to the nonvolatile memory bus, the second datapath unit is an Error Correction Code (ECC) machine, and the third datapath unit is one of: an Exclusive OR (XOR) unit, or a data encryption/decryption unit.

8. The method of claim 3 wherein the output indicates that the first datapath unit is acting on data in response to a host write command and wherein weighting associated with the host write command is modified to prioritize contexts associated with the host write command in the second queue of contexts for the second datapath unit.

9. The method of claim 8 wherein the first datapath unit is a host interface unit and the second datapath unit is one of: an ECC machine, an XOR unit, or a data encryption/decryption unit.

10. The method of claim 3 wherein the output indicates that a command should be weighted so that contexts associated with the command have lower or higher priority.

11. The method of claim 3 further comprising: the datapath control unit applying a weighting scheme to provide data in sequential order to the host interface of the memory controller when the data is received out of sequential order from the nonvolatile memory bus.

12. The method of claim 3 further comprising: the datapath control unit applying a weighting scheme to stream data from the host interface to the memory bus, or to stream data from the memory bus to the host interface.

13. The method of claim 11 further comprising: the datapath control unit applying a time-based adjustment of weighting so that commands increase in priority according to the amount of time they remain uncompleted.

14. A nonvolatile memory controller comprising:

a host interface;

a memory bus;

a first datapath unit between the host interface and the memory bus;

a first context queue that contains contexts for the first datapath unit;

a second datapath unit connected in series with the first datapath unit between the host interface and the memory bus;

a second context queue that contains contexts for the second datapath unit; and a datapath control unit directly connected to the first datapath unit and directly connected to the second datapath unit, the datapath control unit prioritizing contexts in the first and second context queues for the first and second datapath units by providing prioritization information to the first and second datapath control units in parallel.

15. The nonvolatile memory controller of claim 14 wherein the datapath control unit comprises a tag cache that contains entries corresponding to commands, each entry having a weighting that indicates priority of corresponding contexts in the first and second context queues.

16. The nonvolatile memory controller of claim 15 wherein the tag cache is formed by a Content Addressable Memory (CAM).

17. The nonvolatile memory controller of claim 14 wherein the first datapath unit is a nonvolatile memory interface unit and the second datapath unit is an Error Correction Code (ECC) unit.

18. The nonvolatile memory controller of claim 17 further comprising at least a third datapath unit connected in series with the first and second datapath units between the host interface and the memory bus.

19. The nonvolatile memory controller of claim 18 wherein the at least a third datapath unit includes at least one of; (a) an Exclusive OR (XOR) unit, or (b) an encryption unit.

20. The nonvolatile memory controller of claim 14 further comprising a first set of data buffers connected to the first datapath unit and a second set of data buffers connected to the second set of datapath unit.

21. The nonvolatile memory controller of claim 14 wherein the memory bus is a NAND flash memory bus.

22. The nonvolatile memory controller of claim 14 wherein the memory bus is a three-dimensional nonvolatile memory bus.

23. A nonvolatile memory system comprising:

a three dimensional nonvolatile memory array;

a memory bus connected to the three dimensional nonvolatile memory; and a memory controller connected to the memory bus, the memory controller comprising:

a host interface;

a first datapath unit between the host interface and the memory bus;

a first context queue that contains contexts for the first datapath unit;

a second datapath unit connected in series with the first datapath unit between the host interface and the memory bus;

a second context queue that contains contexts for the second datapath unit; and a datapath control unit that is directly connected to the first datapath unit and directly connected to the second datapath unit, the datapath control unit prioritizing contexts in the first and second context queues for the first and second datapath units in parallel.

24. The nonvolatile memory system of claim 23 wherein the three dimensional nonvolatile memory array is a three dimensional NAND memory array that includes NAND strings that extend in a direction perpendicular to a primary surface of a substrate.

25. The nonvolatile memory system of claim 23 wherein the three dimensional nonvolatile memory array is a Resistive Random Access Memory (ReRAM) memory array that includes resistivity switching storage elements.

* * * * *